United States Patent
Chen et al.

(10) Patent No.: US 10,596,602 B2
(45) Date of Patent: Mar. 24, 2020

(54) DELIVERY AND ROUTING MANAGEMENT BASED ON MULTI-IDENTIFIER LABELS

(71) Applicant: Pathover, Inc., San Francisco, CA (US)

(72) Inventors: Christiana Mei Hui Chen, San Francisco, CA (US); Jonathan Chaochin Chen, Mountain View, CA (US)

(73) Assignee: PATHOVER, INC., San Francisco, CA (US)

( * ) Notice: Subject to any disclaimer, the term of this patent is extended or adjusted under 35 U.S.C. 154(b) by 0 days.

(21) Appl. No.: 15/827,922

(22) Filed: Nov. 30, 2017

(65) Prior Publication Data

US 2019/0255573 A1    Aug. 22, 2019

Related U.S. Application Data

(60) Provisional application No. 62/428,523, filed on Nov. 30, 2016.

(51) Int. Cl.
*B07C 5/34* (2006.01)
*G06K 7/14* (2006.01)
*G06Q 10/08* (2012.01)

(52) U.S. Cl.
CPC ............ *B07C 5/3412* (2013.01); *G06K 7/143* (2013.01); *G06Q 10/08355* (2013.01)

(58) Field of Classification Search
None
See application file for complete search history.

(56) References Cited

U.S. PATENT DOCUMENTS

| | | | | |
|---|---|---|---|---|
| 4,948,109 A * | 8/1990 | Petersen | ................ | B65H 39/02 270/1.03 |
| 6,012,102 A * | 1/2000 | Shachar | .............. | G06F 16/9554 710/5 |
| 6,241,099 B1 * | 6/2001 | Hendrickson | ............. | B07C 3/00 209/542 |
| 6,542,933 B1 * | 4/2003 | Durst, Jr. | ............ | G06F 16/9554 709/229 |
| 6,703,574 B1 * | 3/2004 | Kechel | ....................... | B07C 3/02 209/584 |
| 6,783,063 B2 * | 8/2004 | Holden | ..................... | B07C 3/18 235/379 |
| 6,961,456 B2 * | 11/2005 | Bonner | .............. | G06K 9/00973 198/346.1 |
| 7,753,271 B2 * | 7/2010 | Skaaksrud | ............. | G06Q 10/08 235/384 |
| 8,386,397 B1 * | 2/2013 | Agarwal | .............. | G06Q 10/083 705/330 |
| 8,712,923 B2 * | 4/2014 | Kadaba | .................... | B07C 3/00 705/333 |
| 9,616,466 B1 * | 4/2017 | Bauer | .................... | B07C 5/3412 |
| 10,373,226 B1 * | 8/2019 | Russell | .............. | G06Q 30/0613 |
| 2001/0009234 A1 * | 7/2001 | Hendrickson | ............. | B07C 3/00 209/584 |

(Continued)

*Primary Examiner* — Michelle M Entezari
(74) *Attorney, Agent, or Firm* — Polsinelli LLP

(57) ABSTRACT

Systems and methods for sorting, grouping, routing and delivering packages or products to end user customers comprises network-based routing and trip assignment. The packages or products are labeled with a using a plurality visual identifiers that are easily distinguished without requiring either the fulfillment staff or the delivery personnel to review the label for customer names or addresses.

15 Claims, 8 Drawing Sheets

(56) References Cited

U.S. PATENT DOCUMENTS

| | | | | |
|---|---|---|---|---|
| 2004/0030572 | A1* | 2/2004 | Campbell | G01C 21/26 |
| | | | | 705/333 |
| 2006/0235739 | A1* | 10/2006 | Levis | G06Q 10/08 |
| | | | | 705/1.1 |
| 2012/0246090 | A1* | 9/2012 | Griffith | G06Q 10/08 |
| | | | | 705/330 |
| 2014/0172739 | A1* | 6/2014 | Anderson | G06Q 10/0836 |
| | | | | 705/338 |
| 2015/0088780 | A1* | 3/2015 | Paul | G06Q 10/08 |
| | | | | 705/338 |
| 2015/0227890 | A1* | 8/2015 | Bednarek | G06Q 10/08355 |
| | | | | 705/26.81 |
| 2016/0042320 | A1* | 2/2016 | Dearing | G06Q 10/08355 |
| | | | | 705/338 |

* cited by examiner

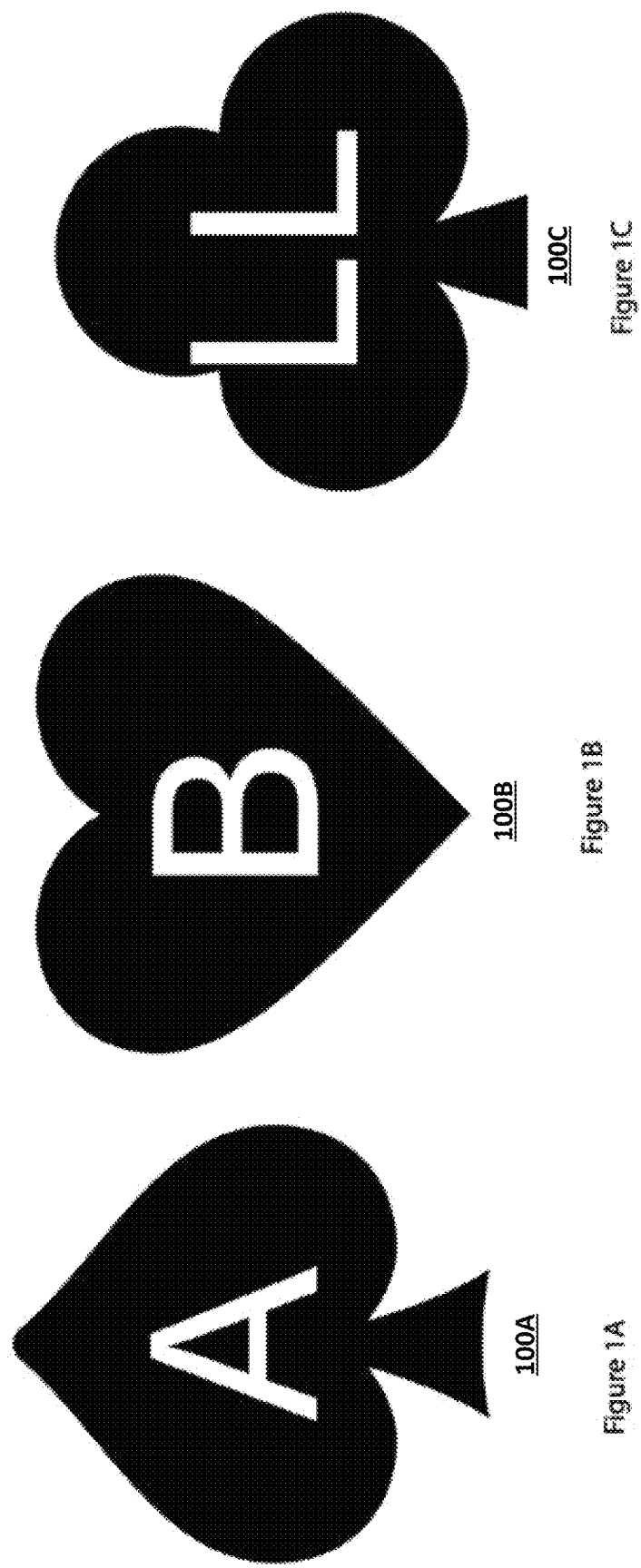

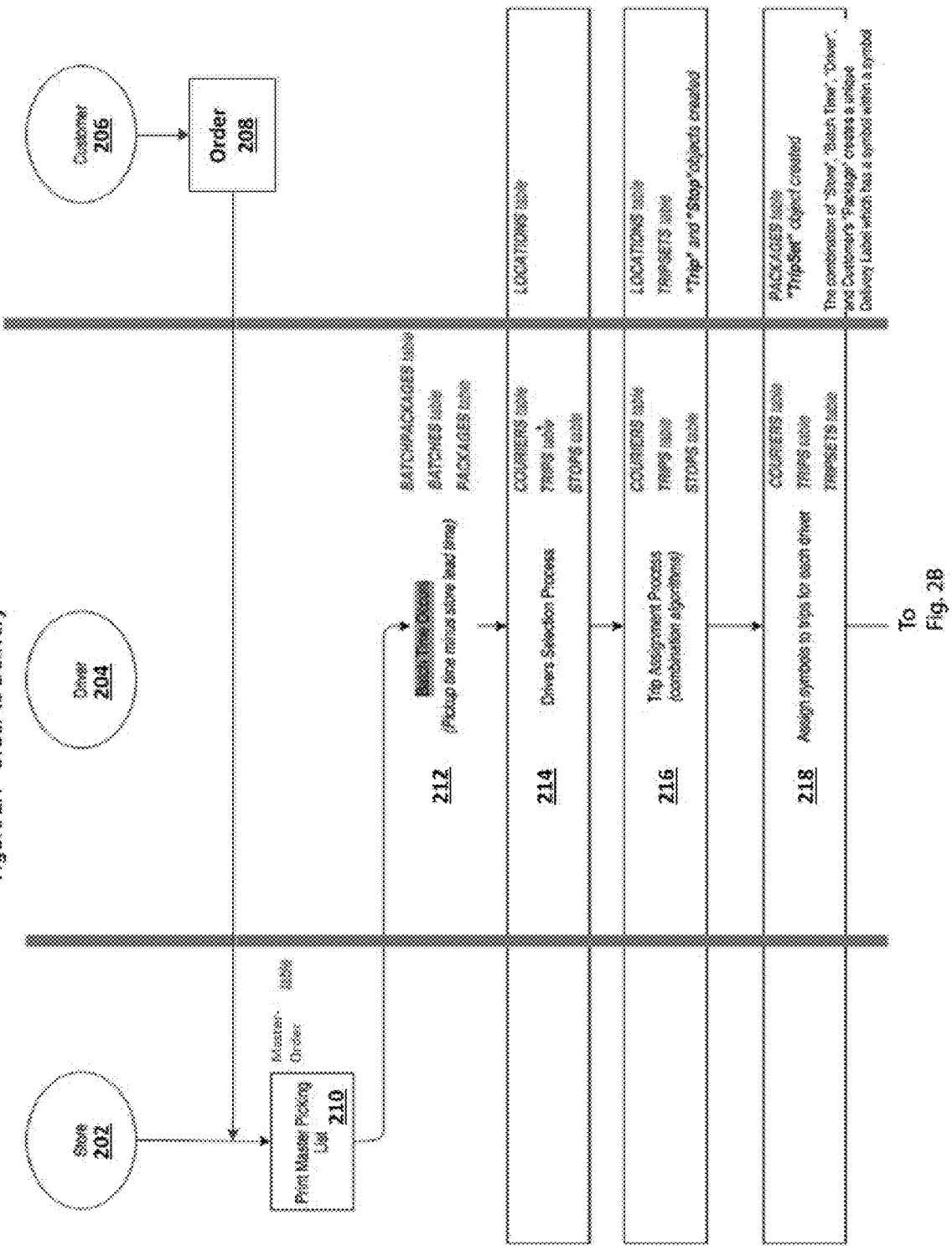

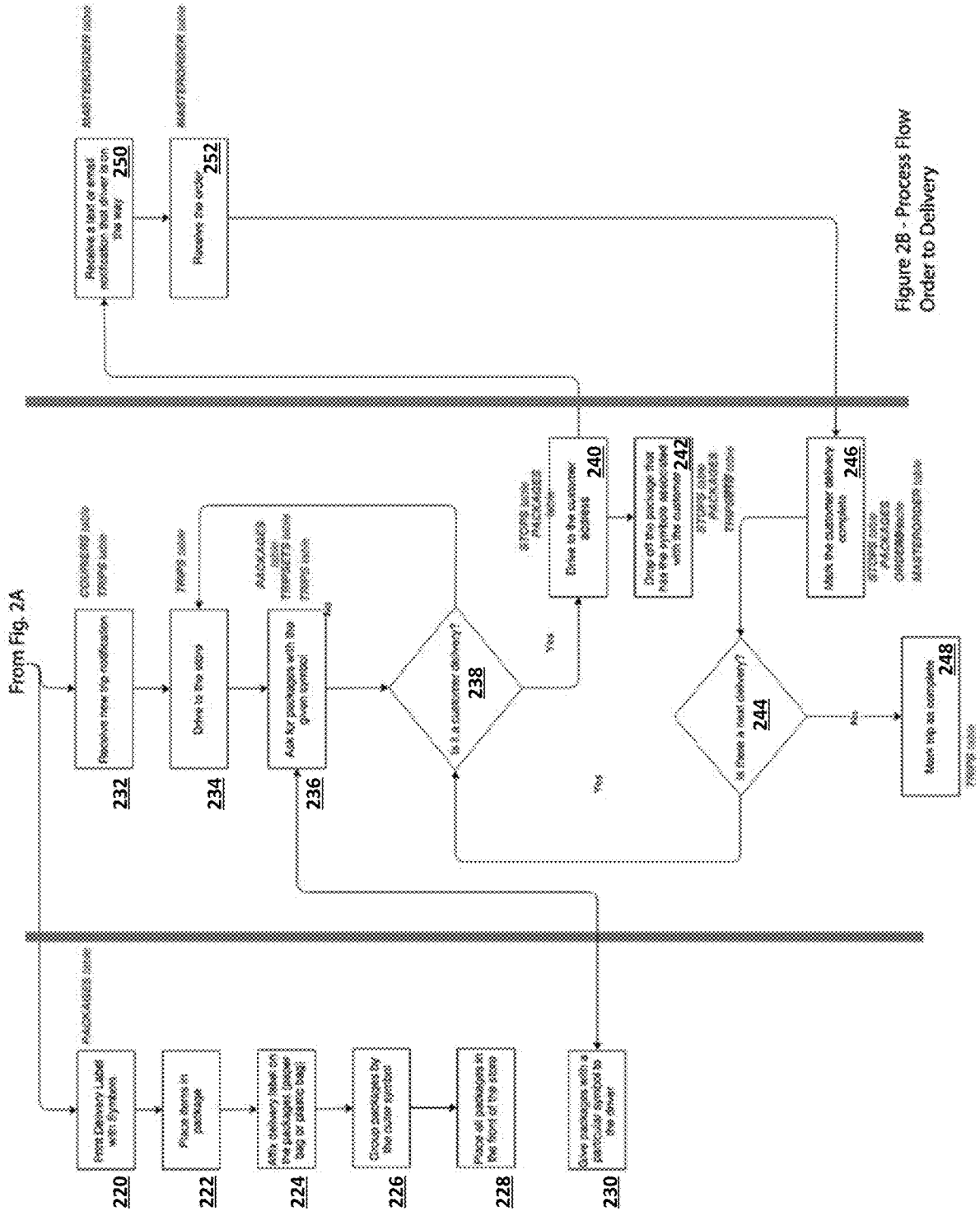

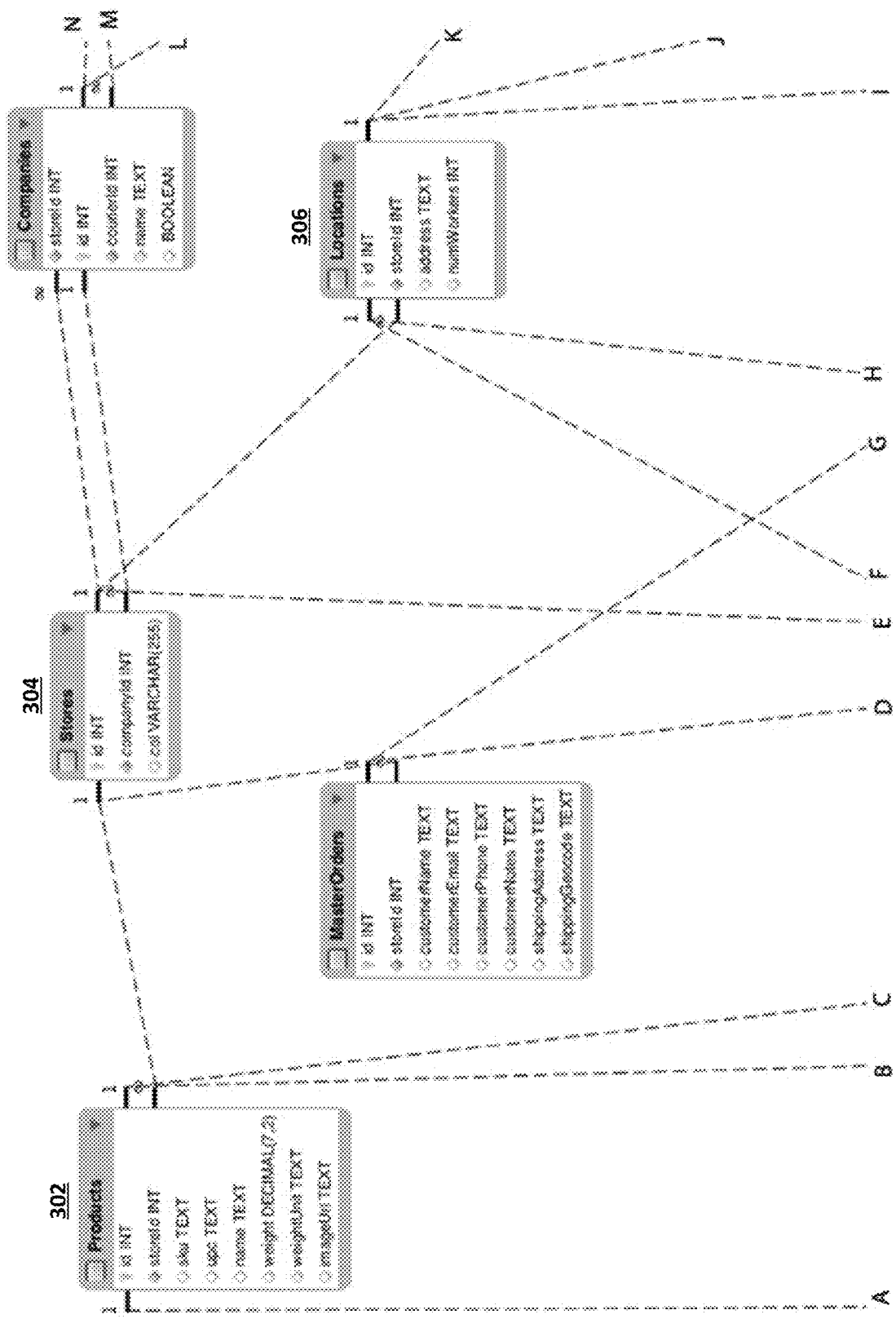
Figure 3A - Database Schema

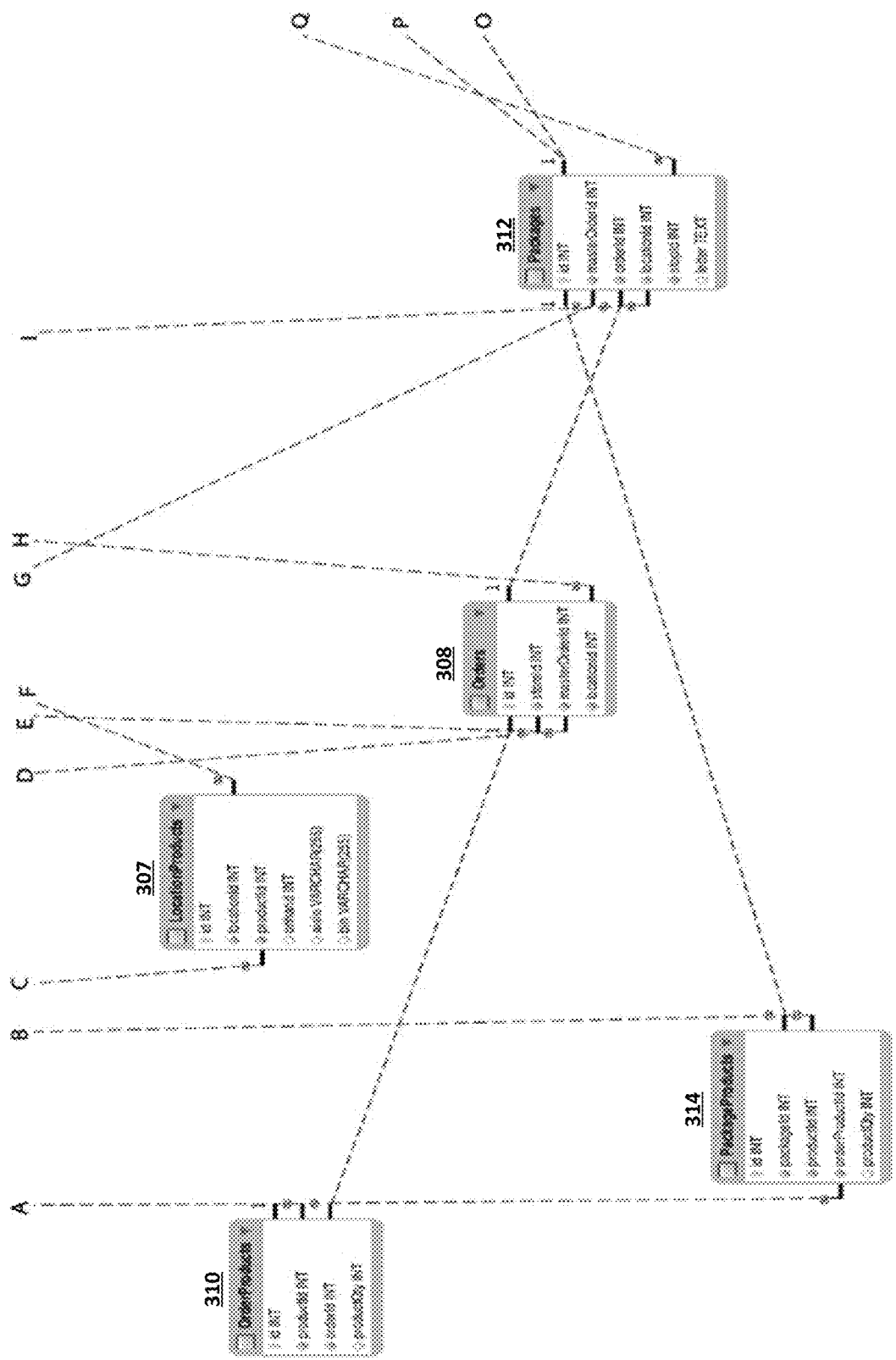
Figure 3B - Database Schema

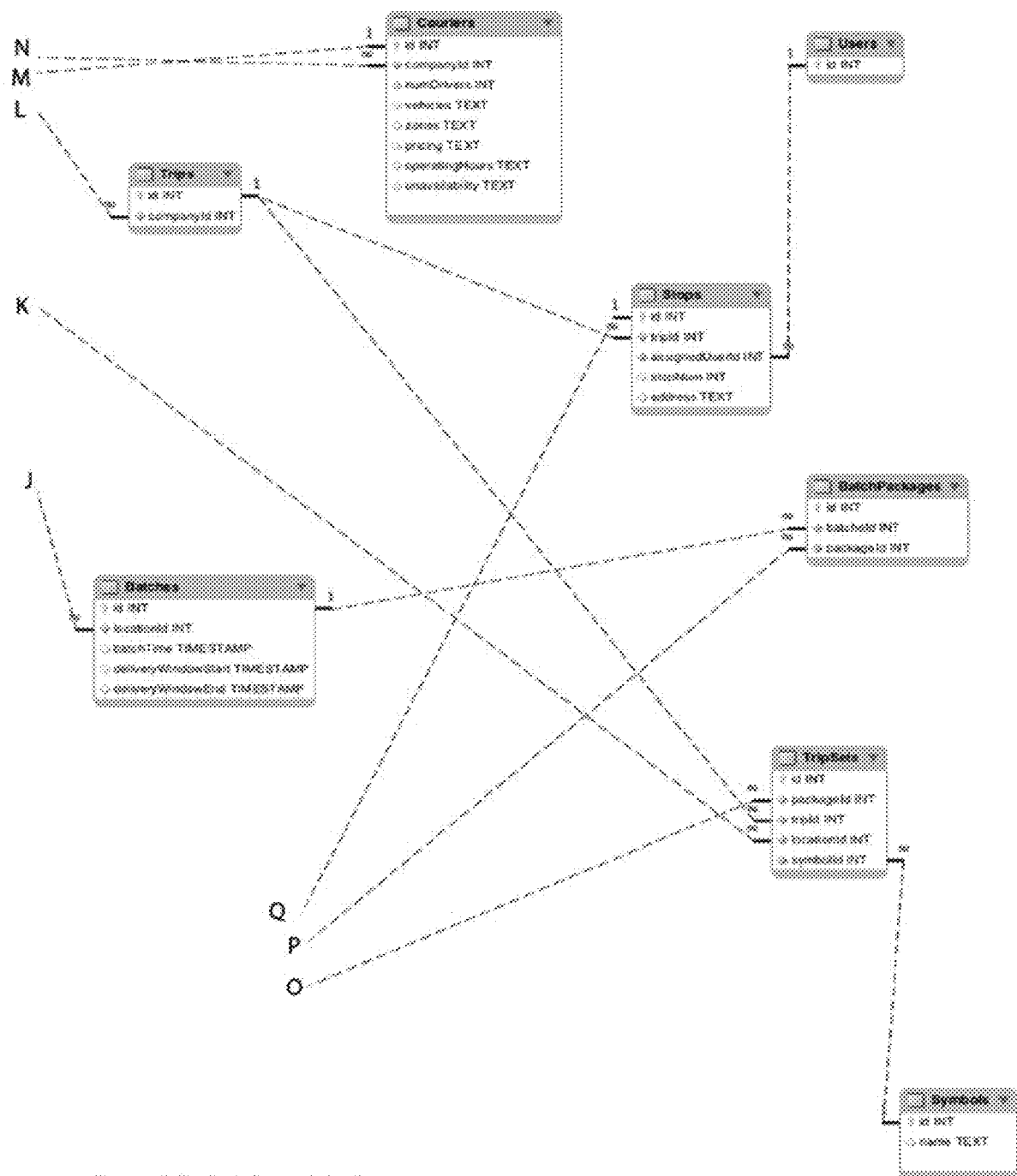
Figure 3C - Database Schema

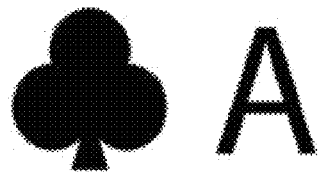
Figure 4A
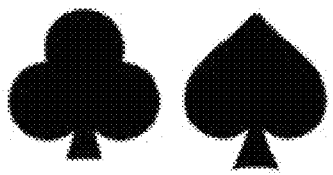
Figure 4B
Figure 4C
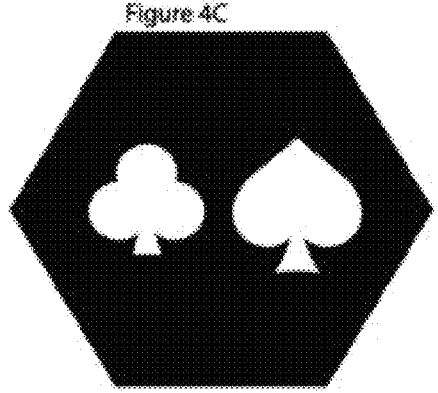
Figure 4D
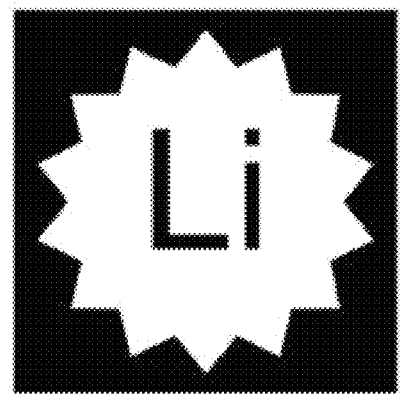
Figure 4E
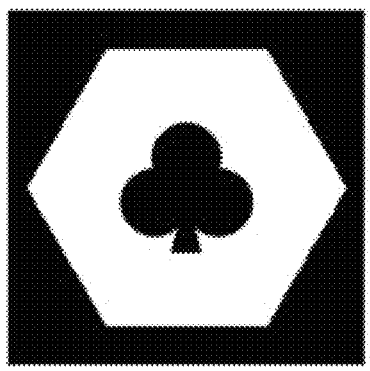
Figure 4F
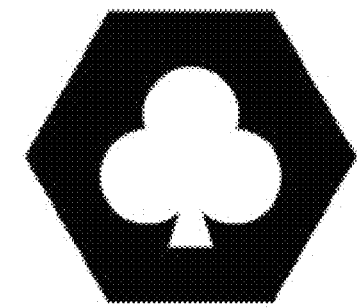
Figure 4G
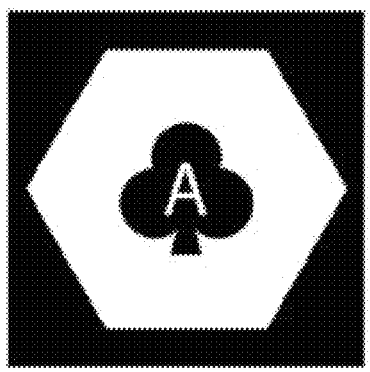
Figure 4H
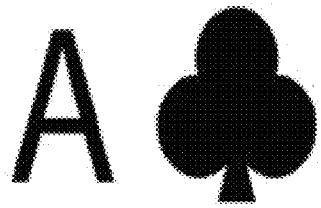

DELIVERY AND ROUTING MANAGEMENT BASED ON MULTI-IDENTIFIER LABELS

CROSS-REFERENCE TO RELATED APPLICATIONS

The present application claims the priority benefit of U.S. provisional patent application 62/428,523 filed on Nov. 30, 2016, the disclosure of which is incorporated by reference herein.

BACKGROUND OF THE INVENTION

1. Field of the Invention

This invention relates generally to delivery and routing systems, and more particularly relates to delivery and routing management systems based on multi-identifier labels.

2. Description of the Related Art

Present day shopping patterns have evidenced a shift from shopping down in brick-and-mortar locations to online shopping. Whereas brick-and-mortar stores generally allow the customer to take possession of the purchased items immediately upon purchase, online sellers must provide for delivery of the purchased item. Concurrent with the rise in online shopping has therefore been an increasing reliance on last-mile delivery services by which online purchases are delivered to the recipient. Systems for routing, scheduling, and effectuating last mile delivery of packages or other items have therefore seen increasing demand.

Presently available last mile delivery routing systems (e.g., Routific or Driv.in) may be inefficient and confusing in their methodologies for sorting and grouping the items to be delivered, as well as for establishing the routes that drivers must travel to deliver the items to their intended destination. For example, most routing systems rely on the human driver correctly identifying a package by name and/or address, when package labels can easily be misread or misinterpreted. The introduction of human error is further magnified in light of the increasing number of deliveries in the modern economy.

As a result, there is a need for a routing and delivery system wherein the sorting, grouping, and delivery of packages or other objects can be done efficiently with minimal mistakes, confusion, and delay.

SUMMARY OF THE CLAIMED INVENTION

Embodiments of the present invention provide for delivery and routing management based on multi-identifier labels. A plurality of orders may be received over a communication network, each associated with a different delivery destination. A master picking list stored in memory may be updated to add an entry corresponding to each of the received orders. The master picking list may be filtered to identify a batch of orders designated for delivery within a specified time period. One or more drivers may be selected and assigned to deliver the batch of orders based on a number of the orders in the batch and the different delivery destination associated with each order in the batch. A route may be generated for each selected driver based on the different delivery destination associated with each order in the batch. Each generated route may therefore be associated with one or more of the orders in the batch. A different primary symbol may be assigned to each generated route, and the assigned primary symbol may further be associated with a set of secondary symbols associated with a sequence. A label may be printed for each order in the batch. Each label may include at least the assigned primary symbol assigned to the associated route and one of the secondary symbols associated with the sequence. A notification may be transmitted to each selected driver, the respective notification including at least the primary symbol assigned to the route generated for the respective driver.

Further embodiments of the present invention may include systems for delivery and routing management based on multi-identifier labels. Such systems may comprise a communication interface that receives a plurality of orders over a communication network, each associated with a different delivery destination. Systems may further include memory that updates a master picking list to add an entry corresponding to each of the received orders and a processor that executes instructions to filter the master picking list to identify a batch of orders designated for delivery within a specified time period, select one or more drivers to be assigned to deliver the batch of orders based on a number of the orders in the batch and the different delivery destination associated with each order in the batch, generate a route for each selected driver based on the different delivery destination associated with each order in the batch, and assign a different primary symbol to each generated route where the assigned primary symbol is further associated with a set of secondary symbols associated with a sequence. Systems may further include a printer that prints a label for each order in the batch where each label includes at least the assigned primary symbol assigned to the associated route and one of the secondary symbols associated with the sequence. The communication interface may thereafter transmit a notification to a driver device of each selected driver, the respective notification including at least the primary symbol assigned to the route generated for the respective driver.

BRIEF DESCRIPTION OF THE DRAWINGS

FIGS. 1A-1C each illustrates alternative embodiments of a multi-identifier label.

FIGS. 2A-2B are swimlane diagrams illustrating an exemplary method for delivery and routing management based on multi-identifier labels.

FIGS. 3A-3C illustrate an exemplary database schema that may be used in systems for delivery and routing management based on multi-identifier labels.

FIGS. 4A-4H illustrate various alternative embodiments of the multi-identifier labels shown in FIGS. 1A-1C.

DETAILED DESCRIPTION

Figure 5:
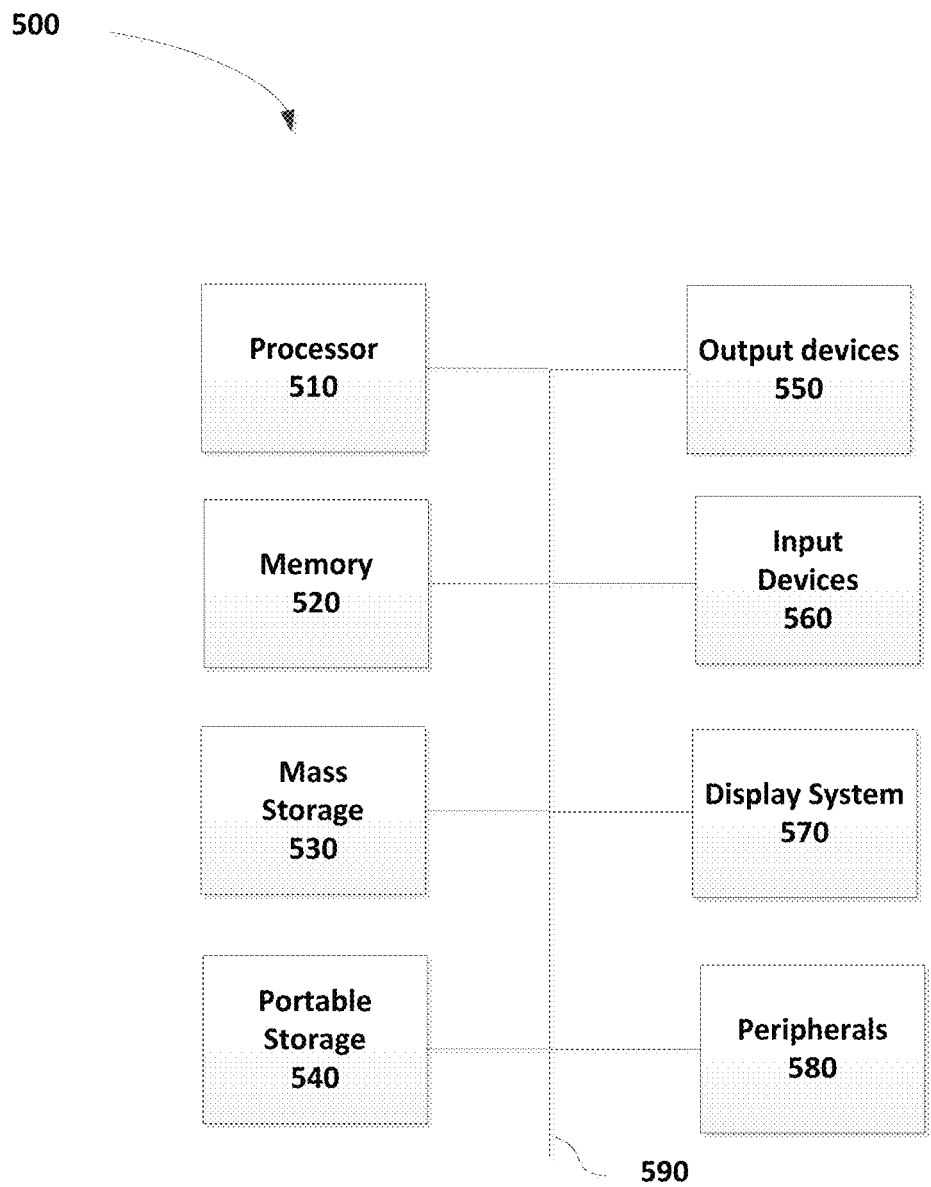
FIG. 5 is a block diagram of an exemplary computing device that may be used to implement an embodiment of the present invention.

Embodiments of the present invention provides systems and methods for sorting, grouping, labeling, and routing last-mile deliveries in a manner so as to overcome various limitations of conventional routing and delivery systems. In one aspect of the invention, electronic orders from customers may be parsed to permit filling the order from more than one location, the order may be assigned to a route, and a route may be assigned to a driver. The items in the customer's order may be selected and grouped by the store's personnel or automated selection system and arranged for pickup and delivery by one or more drivers from a fleet of drivers or a variety of delivery services.

More particularly, orders may be filled from optimized locations with optimized driver selection and routing. Further, the use of conventional name and addresses to identify the customer and delivery location may be superseded by convenient, reliable, and easy-to-read labels that provide a first symbol as a primary identifier that identifies a group of packages to be delivered by a specific driver. In an embodiment, a second identifier (e.g., another symbol, number, letter, or similar) is overlaid on top of the first symbol or other indicia, and indicates the order and address of the destination for each specific package. Thus, each of the packages to be delivered by a single driver may have one symbol (or other identifier or indicia) that is the same for each package. A second identifier or other indicia may be different on each package within the group.

The routes for each driver may be determined by a computer running an appropriate algorithm (e.g., Routific or similar), and may be specific to a pickup time. Once the route for that pickup time has been determined, (including all necessary ancillaries), the central server running the routing and grouping software may assign to each package a label comprising the combination of symbols that indicates the correct group and order within the group. Depending upon the implementation, the label may be printed and affixed to each package within an order, or may be affixed to a container for that order, or other suitable arrangement.

Because every package being delivered by a single driver or along a single route may use at least one symbol in common, the grouping of packages for pickup by each driver is straightforward, requires no training, and avoids any confusion (e.g., caused by misreading text). In an embodiment, the first symbol assigned to each driver may be larger than the second symbol that is used to indicate delivery order within that driver's group of packages to be delivered. It can therefore be appreciated that the system and method of the present invention provides a quick, easy, and reliable method for sorting packages into driver-specific groups, and further for identifying the order in which the packages within a given group are to be delivered. The specific location where a package is to be delivered is, in an embodiment, identified on a display screen available to the driver, with the screen providing a display of the package symbole specific to the location, together with a delivery address. The information displayed to the driver may be, in an embodiment, automatically generated by the routing program operating on the server, and downloaded to the driver's display devices (e.g., smartphone, tablet, or similar).

FIGS. 1A-1C each illustrates alternative embodiments of a multi-identifier label. Each multi-identifier label 100A-C may include at least two different types of identifiers: a symbol and a sequential indicator. FIG. 1A illustrates a first multi-identifier label 100A that depicts a spade symbol stamped with an alphabetic letter 102 (the letter "A"). Meanwhile, FIG. 1B illustrates another multi-identifier label 100B that depicts a heart symbol with the alphabetic letter "B," while FIG. 1C illustrates yet another multi-identifier label 100C that depicts a club symbol with a pair of alphabetic letters "LL."

As discussed herein, each symbol may be assigned to a different driver (driving a different route). Thus on a given day, a first driver may be assigned to a route associated with the spade symbol as depicted in multi-identifier label 100A of FIG. 1A, while as second driver may be assigned to a route associated with the heart symbol as depicted in the multi-identifier label 100B of FIG. 1B, and a third driver may be assigned to a route associated with the club symbol as depicted in multi-identifier label 100C of FIG. 1C. Such symbols may therefore allow for ease, speed, and accuracy of sorting.

Further, in the schema of FIGS. 1A-1C, each different delivery address within the group of addresses that forms a single driver's route may be assigned a different sequential indicator. For example, the driver assigned the spade symbol in multi-identifier label 100A of FIG. 1A may have, for example, 50 different delivery addresses. The letter "A" may be assigned to the first address, the letter "B" assigned to the second address, and so on alphabetically through the last planned delivery, which may be assigned the letters "AX." Other types of sequences (e.g., numeric) may also be used to designate an order of delivery to the packages associated with the route. Any suitable symbol can be used for the background symbol of multi-identifier labels 100A-C, including playing card suits (e.g., heart, spade, club, diamond), shapes (e.g., sun, cloud, hexagon, star, bell), emoji-type symbols, etc. Similarly, the sequential indicator may use any type of sequence, including any combination of alphabetic characters (in either upper or lower case), numbers, punctuation marks, special characters, or other symbols scaled to fit within or adjacent to the grouping (e.g., route-indicating) symbols.

FIGS. 2A-2B are swimlane diagrams illustrating an exemplary method 200 for delivery and routing based on multi-identifier labels. In the method 200, communications and information may be transmitted between store server 202, driver device 204, and customer device 206. For example, customer device 206 may place an online order 208 with the store server 202 (e.g., hosting an online store website). Such customer device 206 may include any computing device known in the art, including computers, tablets, smartphones, or similar. The customer device 206 may be associated with a customer who enters the information regarding the order 208 over a communication network. Such order information may include item selection, account information, discount or rewards codes, delivery preferences, etc. The order 208 may thereafter be sent to the store server 202 for fulfillment and delivery.

The store server 202 may be inclusive of any type of network-connected computer server or similar system suitable for performing the functions described in connection with the process flows of FIGS. 2A-2B and the database schema of FIGS. 3A-3C (as discussed in further detail herein). The store server 202 may be associated with one or more entities, physical store locations, warehouses, fulfillment relationships, as well as with a virtual store without a brick and mortar presence. For convenience of illustration, references to a store may encompass all of the foregoing entities that may be associated with a server 202.

An order 208 received by store server 202 may comprise a plurality of items, some of which may be provided from a different location than other items. Upon receipt of a customer's order 208 as shown in FIG. 2A, the store server 202 may add a row to a Master-Order table (e.g., Master-Order table 304 of FIGS. 3A-3C). The added row may comprise an order ID and customer information (e.g., email, phone and address), as well as other metadata specific to the order (e.g., items or products being ordered, a requested delivery time, notes from the customer, locations for drop-off or entry-access requirements, and so on).

The store server 202 may then parse the information in the order 208 to identify which items or products (e.g., listed in a Products table 302 in FIG. 3A) may best be supplied by which stores (e.g., as indicated by the Stores table 306 in FIG. 3A), and/or the physical location or locations (e.g., from the associated Locations table 310 in FIG. 3A) assigned to supply a given product, together with a Location-Products table 316 in FIG. 3B. An Order table 318 may then be updated to identify the physical location designated as the source of the specific item. Multiple rows or entries in the Order table 318 may be created if more than one store location is designated to provide a product that is part of the customer's order 208. For each location designated to provide products for the customer's order, an Order-Products table 312 may be updated to reflect which products in an order are coming from which location. Further, to allow for different delivery times, each order 208 may be further split into a Packages table 320 with each package representing the portion of the entry in the Order-Products table 312 coming from that fulfillment location at a specified time. Thus, each order 208 may comprise a plurality of entries in the Order-Products table 312 and a plurality of entries in the Packages table 320. Further, the Packages table 320 may comprise a plurality of entries from Package-Products table 314 to show which products comprise a particular package.

The store server 202 may then designate which products are to be sourced from which stores, and which products or items are to be grouped for pickup at a specific time to meet the customer's delivery requirements. In step 210, a Master Picking List can be generated by the store server 202 and distributed to the stores or other fulfillment facilities. In step 212, a batch process may begin to allow time for the various products to be retrieved from stock and collected for further processing. In fully automated warehouses using robotic stock picking, the store server 202 may direct the collection of the specified products for each Package-Product entry. For manual stock picking, a pick list may be generated by the store server 202 for use by the staff of the store or fulfillment facility, and, again, the products may be grouped as specified by the store server 202 in accordance with the Packages table 320, Batches table 324, and Batch-Packages table 332.

The store server 202 may therefore provide driver device 204 with delivery assignments and related information. Driver device 204 in FIG. 2A may be associated with a delivery person. Such driver device 204 may include any known network-connected device suitable for receiving delivery information from the store server 202.

Entries in the Packages table 320 may be added to a Batch-Packages table 332, which references a Batches table 324. The Batches table 324 may store time data for when a store stops taking orders for a specified pickup period and may also store the timeframe during which delivery of those Products is to occur. It may be appreciated by those skilled in the art that the Batch-Packages table 332 stores the cross-reference between the Batches table 324 and the Packages table 320.

As part of the batch sequence, the store server 202 may identify from the Batch-Packages table 332 the number of packages to be delivered. The total number of packages can all be assigned to a single driver, or, more frequently, the total number will be divided among several or many drivers. In step 214, the store server 202 may determine what packages are assigned to be delivered by which driver and using what routing. Such determination may involve consolidating all orders to be picked up at a specified time or window of time. The store server 202 may further determine what combination of drivers is available to handle the deliveries using at least the Couriers table 326 of FIG. 3C. In some situations, a route may have already been assigned to a driver, and the store server 202 may assess a Trips table 322 and Stops table 328 for that driver. Depending upon the implementation, the drivers can be employees, contractors, or third party service providers.

Once the universe of available drivers is determined by the store server 202, the store server 202 may develop a delivery route for each driver in step 216. Such trip development may involve creation of an entry in the Trips table 328, which may use information from a Users table 330. The delivery route can either be a new route or an amended version of a previously-assigned route.

Upon assignment of a route to a driver (as well as allocation of the respective batch of packages to be delivered by that driver), a label symbol may be assigned to that driver for the imminent pick-up time in step 218. As shown in FIGS. 1A-1C and FIGS. 4A-4H, there is a wide and diverse universe of available symbols such that each driver may be assigned a unique primary (route-indicating) symbol that coordinates with a second (sequence-indicating) symbol. As appropriate in a given embodiment, a primary, route-identifying symbol may be chosen from a Symbols table 336 in conjunction with a Trip-Sets table 334. A label including the selected symbol may be generated for each package being picked up by the assigned driver at that time, or for a container of all or a plurality of the items being picked up by the assigned driver at that time.

Each label in the set of packages assigned to the driver may further include a secondary, sequence-indicating symbol (e.g., letter, number, or other symbol) that indicates where in the sequence the package is to be delivered by the assigned driver. The secondary identifier may be used to identify customer-specific delivery information. In some embodiments, such secondary sequence-identifying symbol may be placed within the perimeter of the primary identifier. The combination of primary and secondary symbols may depend upon the particular store, driver, and customer, and can change with each pickup. In one embodiment, the combination of store, driver, and customer creates a unique key that may be stored within the database and linked to a specific package at a pickup time. On an assigned route in a specific driver's vehicle, no package will have the same primary and secondary identifier combination as any other package. Note, however, in at least some embodiments, the packages on a single route/pickup time may have the same primary identifier.

It can thus be appreciated that the primary identifier enables the fulfillment center staff to print the multi-identifier label in step 220, quickly group the products or items that comprise a specific package in step 222, affix the label to either the products individually or the package as a whole in step 224, group packages in a single route by primary symbol in step 226, and make those packages ready for pickup by their respective drivers in steps 228 and 230.

Substantially concurrently, in step 232, the drivers being assigned routes may be advised of their respective route via a new trip notification sent to their respective driver device 204. In step 232, the driver may arrive at the store and in step 234, asks for their respective assigned packages as designated by the specific primary identifier that had been assigned in step 218. There is no need to identify names, routes, or other indicia beyond the primary identifier, thereby making the handoff of products from the fulfillment staff to the delivery driver simple, quick, and reliable without requiring any significant training of either fulfillment staff or drivers. Whereas such an implementation merely involves a brief visual inspection for the assigned symbol, prior art systems may have involved reading each text label and checking against a list or map or other reference, which may introduce errors or inefficiencies.

In an alternative implementation, selection of the primary symbol; may be arranged to be unique to a specific driver at the batch level, rather than at the trip level. Such an arrangement may permit for more combinations to be created with a smaller symbol set than would be required if the primary identifier is unique to each driver per trip. In an exemplary implementation in which the primary symbol is assigned uniquely to each batch, there are three stores A, B, and C, there are two drivers 1 and 2, and there are eight customers who have ordered deliveries.

STORE A: Driver 1 (CLOVER)
STORE B: Driver 2 (CLOVER)
STORE C: Drivers 1 & 2 (CLOVER & SPADE respectively)
STORE A—Driver 1—ALICE (customer name): CLOVER A
STORE A—Driver 1—BEN (customer name): CLOVER B
STORE B—Driver 2—CHAD (customer name): CLOVER A
STORE B—Driver 2—DAN (customer name): CLOVER B
STORE C—Driver 1—EVE (customer name): CLOVER C
STORE C—Driver 1—FRED (customer name): CLOVER D
STORE C—Driver 2—GREG (customer name): SPADE A
STORE C—Driver 2—HANNAH (customer name): SPADE B
Inside Driver 1's vehicle
STORE A—Driver 1—ALICE: CLOVER A
STORE A—Driver 1—BEN: CLOVER B
STORE C—Driver 1—EVE: CLOVER C
STORE C—Driver 1—FRED: CLOVER D
Inside Driver 2's vehicle
STORE B—Driver 2—CHAD: CLOVER A
STORE B—Driver 2—DAN: CLOVER B
STORE C—Driver 2—GREG: SPADE A
STORE C—Driver 2—HANNAH: SPADE B Once the drivers have picked up their packages with the assortment of products scheduled for delivery, the process advances to step 238, which queries whether a customer delivery is pending. A customer delivery (or pickup) comprises a stop, which forms an entry in the Stops table 324. If so, in step 240, the driver device 204 may direct the driver to the customer's address, which may but need not always be printed on the package. At the customer's address, the driver drops off the package having the secondary identifiers associated with that customer at step 242. As appropriate, the driver device 204 (e.g., tablet or other network-connected device) may provide any further customer instructions regarding placement of the package, entry details, and so on. Once the package has been dropped off, in step 250, a message may be sent to the customer, either by email or text regarding the delivery. Depending upon the embodiment, the drop-off may be registered in the database (e.g., the Stops table 328, Packages table 3320, Orders table 318, and Master-Order table 304. In step 252, the customer may retrieve or otherwise take possession of the package in fulfillment of the order 208. In other embodiments, acknowledgement of receipt by the customer may be required as in step 246 before updates are provided to the database(s) to reflect a completed delivery. Some embodiments can provide for both, at either customer or store direction.

In some instances, the stop may entail a pickup, such as a return or the initiation of a new customer order requiring delivery to a different destination. In addition, if a package is undeliverable—either because the customer is required to be home, the address is wrong, access is not possible, or any other error of the type that may be encountered by delivery personnel—the database may be updated to reflect that the delivery failed and must be returned to the store.

Once the delivery is marked as complete or as failed, the process may advance to step 244 where it is queried as to whether there is a next delivery. If there is, the process loops to step 238, and the customer delivery steps may be repeated for the new delivery. Eventually, the last delivery has been made, and the process advances to step 248 where the trip is marked as complete.

As noted above, FIGS. 4A-4H show a non-limiting variety of alternative shapes suitable for use as the primary and secondary identifiers. Additional such shapes can include colors, inverted colors, foreign characters, overlapping symbols, more than two identifiers (e.g., a symbol on a symbol on an alphanumeric character or combination of characters, more than two symbols arranged to be readily distinguished as primary, secondary, tertiary, and so on, one or more rotated symbols or rotated alphanumeric characters, arrays of symbols having alphanumeric characters within the symbol array or arrays, patterns of one or more symbols combined with alphanumeric data to create a new symbol, holographic representations, cut-out patterns, or raised or otherwise textured symbols).

For some embodiments, an alternative process for assigning dual-identifier labels to a particular product can be as follows:

1. Start with a set of N packages where N is the number of packages
2. Search available drivers who already have trips created
3. Search available drivers who do not have trips created
4. Find best combination in terms of cost and distance of drivers available to deliver the N packages
5. Assign a unique symbol for this store at this pick up time to each driver
6. Assign a character/symbol to each package so that every symbol-character combination is unique for each driver and their current trip.

A still further alternative process can be:

1. Start with a set of N packages where N is the number of packages.
2. Query database "Trips" table to find existing trips nearby. Check which driver is assigned to that existing trip and consider that driver as the deliverer for the new set of packages
3. Query database "Couriers" and check which courier drivers are available to deliver the new set of packages
4. Comparing pricing structures of each driver and find the best combination of available drivers to deliver new set of packages.
5. Once drivers are found
   If driver has an existing trip, create and append new stops to the trip.
   If driver does not have an existing trip, create a new trip row and create new stops corresponding the packages being delivered at those stops.
6. Create a new set row and insert into "TripSets" table. A tripset in the database represents all the packages that 1 driver will deliver on a particular trip regardless of which location that package originated from. A unique symbol for the store and its pick up time will be assigned to each set row in the database corresponding to the driver.

7. Each package in the "Packages" table will be assigned a character/symbol to represent that package in the trip it is in. Every symbol character combination is unique for each driver and their current trip.

FIG. 5 illustrates an exemplary computing system 500 that may be used to implement an embodiment of the present invention. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Those skilled in the art can, given the teachings herein, appreciate that new and novel systems and methods for sorting, grouping, routing and delivery of packages and products have been described. While various embodiments of the invention have been disclosed in detail, it will be appreciated that the features of the exemplary embodiments discussed herein are not to be limiting, and that numerous alternatives and equivalents exist which do not depart from the scope of the invention. As such, the present invention is to be limited only by the appended claims.

What is claimed is:

1. A system for delivery and routing management based on multi-identifier labels, the system comprising:
   a communication network interface that receives a plurality of orders over a communication network, each order associated with a different delivery destination;
   memory that updates a master picking list, wherein an entry corresponding to each of the received orders is added to the master picking list;
   a processor that executes instructions stored in memory, wherein execution of the instructions by the processor:
      filters the master picking list to identify a batch of orders designated for delivery within a specified time period, selects one or more drivers to be assigned to deliver the batch of orders based on a number of the orders in the batch and the different delivery destination associated with each order in the batch,
      generates a route for each selected driver based on the different delivery destination associated with each order in the batch, the generated route including a plurality of stops in a sequence, and
      assigns a different primary visual indicator to each generated route, wherein each assigned primary visual indicator is configured to be readable by human visual inspection and is further associated with a set of sequential indicators each corresponding to where an associated one of the stops appears within the sequence of the associated route, the set of sequential indicators including non-alphanumerical indicators; and
   a printer that prints a static label for each order in the batch, wherein each static label depicts at least the primary visual indicator assigned to the associated route and the sequential indicator that identifies where the associated stop appears within the sequence of the associated route, and
   wherein the communication network interface transmits a notification to a driver device of each selected driver, the respective notification including at least the primary visual indicator assigned to the route generated for the respective driver, wherein labels printed for the route include the same primary visual indicator.

2. The system of claim 1, further comprising one or more robots, wherein the processor directs the robots to collect one or more items in each order in the batch.

3. The system of claim 1, wherein the processor further generates at least one pick list based on one or more of the generated routes and the orders associated with each route.

4. The system of claim 1, wherein the processor generates the route by creating a new route and storing information regarding the new route in memory.

5. The system of claim 1, wherein the processor generates the route by amending a previous route stored in memory.

6. The system of claim 1, wherein the processor further identifies that the orders in the batch are assigned to be sourced at a plurality of different locations.

7. The system of claim 6, wherein the processor assigns the different primary visual indicator to each generated route further based on a batch associated with one of the different locations.

8. A method for delivery and routing management based on multi-identifier labels, the method comprising:

receiving a plurality of orders over a communication network, each order associated with a different delivery destination;

updating a master picking list stored in memory, wherein an entry corresponding to each of the received orders is added to the master picking list;

executing instructions stored in memory, wherein execution of the instructions by the processor:

filters the master picking list to identify a batch of orders designated for delivery within a specified time period, selects one or more drivers to be assigned to deliver the batch of orders based on a number of the orders in the batch and the different delivery destination associated with each order in the batch, generates a route for each selected driver based on the different delivery destination associated with each order in the batch, wherein each generated route is associated with one or more of the orders in the batch, the generated route including a plurality of stops in a sequence, and assigns a different primary visual indicator to each generated route, wherein each primary visual indicator is configured to be readable by human visual inspection and is further associated with a set of sequential indicators each corresponding to where an associated one of the stops appears within the sequence of the associated route, the set of sequential indicators comprising non-alphanumerical indicators;

printing a static label for each order in the batch, wherein each static label depicts at least the primary visual indicator assigned to the associated route and the sequential indicator that identifies where the associated stop appears within the sequence of the associated route; and transmitting a notification to each selected driver, the respective notification including at least the primary visual indicator assigned to the route generated for the respective driver, wherein labels printed for the route include the same primary visual indicator.

9. The method of claim 8, further comprising directing collection of one or more items in each order in the batch via one or more robots.

10. The method of claim 8, further comprising generating at least one pick list based on one or more of the generated routes and the orders associated with each route.

11. The method of claim 8, wherein generating the route comprises creating a new route and storing information regarding the new route in memory.

12. The method of claim 8, wherein generating the route comprises amending a previous route stored in memory.

13. The method of claim 8, further comprising identifying that the orders in the batch are assigned to be sourced at a plurality of different locations.

14. The method of claim 13, wherein assigning the different primary visual indicator to each generated route is further based on a batch associated with one of the different locations.

15. A non-transitory computer-readable storage medium, having embodied thereon a program executable by a processor to perform a method for delivery and routing management based on multi-identifier labels, the method comprising:

receiving a plurality of orders over a communication network, each order associated with a different delivery destination;

updating a master picking list stored in memory, wherein an entry corresponding to each of the received orders is added to the master picking list;

filtering the master picking list to identify a batch of orders designated for delivery within a specified time period;

selecting one or more drivers to be assigned to deliver the batch of orders based on a number of the orders in the batch and the different delivery destination associated with each order in the batch;

generating a route for each selected driver based on the different delivery destination associated with each order in the batch, wherein each generated route is associated with one or more of the orders in the batch, the generated route including a plurality of stops in a sequence;

assigning a different primary visual indicator to each generated route, wherein each assigned primary visual indicator is configured to be readable by human visual inspection and is further associated with a set of sequential indicators each corresponding to where an associated one of the stops appears within the sequence of the associated route, the set of sequential indicators comprising non-alphanumerical indicators;

printing a static label for each order in the batch, wherein each static label depicts at least the primary visual indicator assigned to the associated route and the sequential indicator that identifies where the associated stop appears within the sequence of the associated route; and transmitting a notification to a driver device of each selected driver, the respective notification including at least the primary visual indicator assigned to the route generated for the respective driver, wherein labels printed for the route include the same primary visual indicator.

* * * * *